(12) United States Patent
Chhabra et al.

(10) Patent No.: US 11,285,918 B2
(45) Date of Patent: Mar. 29, 2022

(54) SECURE ACCESS TO VEHICLE USING BIOMETRIC IDENTIFIER

(71) Applicant: Micron Technology, Inc., Boise, ID (US)

(72) Inventors: Bhumika Chhabra, Boise, ID (US); Madison E. Wale, Boise, ID (US); Claudia A. Delaney, Garden City, ID (US); Elsie de la Garza Villarreal, Nampa, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/880,162

(22) Filed: May 21, 2020

(65) Prior Publication Data
US 2021/0362679 A1 Nov. 25, 2021

(51) Int. Cl.
*B60R 25/25* (2013.01)
*B60R 25/09* (2013.01)
(Continued)

(52) U.S. Cl.
CPC .............. *B60R 25/25* (2013.01); *B60R 25/09* (2013.01); *B60R 25/2018* (2013.01); *B60R 25/33* (2013.01)

(58) Field of Classification Search
CPC ......... B60R 25/00; B60R 25/04; B60R 25/09; B60R 25/20; B60R 25/255; B60R 25/257
See application file for complete search history.

(56) References Cited

U.S. PATENT DOCUMENTS

| | | | |
|---|---|---|---|
| 6,898,299 B1 * | 5/2005 | Brooks | G07C 9/37 382/115 |
| 9,679,210 B2 | 6/2017 | Sutton et al. | |

(Continued)

FOREIGN PATENT DOCUMENTS

| | | |
|---|---|---|
| JP | 2006044398 A | 2/2006 |
| JP | 2020009302 A | 1/2020 |
| KR | 101421681 B1 | 7/2014 |

OTHER PUBLICATIONS

"Fingerprint Recognition for the Car: Use Cases and Design Considerations", ElectronicDesign.com; retrieved online on Mar. 17, 2020 from url: https://www.electronicdesign.com/markets/automotive/article/21119162/fingerprint-recognition-for-the-car-use-cases-and-design-considerations, 8 pages.

(Continued)

*Primary Examiner* — Benyam Haile
(74) *Attorney, Agent, or Firm* — Perkins Coie LLP

(57) ABSTRACT

Secure access to a vehicle is described, in which one or more biometric identifiers of a user may be utilized to enable the vehicle. The user may not operate the vehicle without satisfying security measures based on his/her biometric identifier generated from various biological traits. In some embodiments, an artificial engine and/or algorithm may be combined to facilitate the authentication process to determine whether the user is authorized to use the vehicle. The secure access features may also manage a list of biometric identifiers of the authorized users. In some instances, the secure access features may be temporarily disabled. Further, individual parts of the vehicle may be associated with a unique identifier of the vehicle (which may include a vehicle identification number), and/or may be configured to transmit their geological locations determined by a global positioning system (GPS).

17 Claims, 5 Drawing Sheets

(51) Int. Cl.
*B60R 25/33* (2013.01)
*B60R 25/20* (2013.01)

(56) References Cited

U.S. PATENT DOCUMENTS

| | | | | |
|---|---|---|---|---|
| 2008/0252412 | A1* | 10/2008 | Larsson | B60R 25/252 |
| | | | | 340/5.2 |
| 2012/0242469 | A1* | 9/2012 | Morgan | B60K 28/063 |
| | | | | 340/426.11 |
| 2013/0090784 | A1* | 4/2013 | Hibbert | B60R 25/08 |
| | | | | 701/2 |
| 2014/0294180 | A1* | 10/2014 | Link, II | H04W 12/06 |
| | | | | 380/270 |
| 2016/0101783 | A1* | 4/2016 | Abou-Nasr | B60W 40/08 |
| | | | | 340/5.82 |
| 2017/0282856 | A1* | 10/2017 | Riedel | B60R 25/24 |
| 2018/0012424 | A1* | 1/2018 | Ricci | G08G 1/096775 |
| 2018/0053034 | A1* | 2/2018 | Merrell | H04L 63/0861 |

OTHER PUBLICATIONS

International Search Report and Written Opinion dated Aug. 25, 2021 for International Patent Application No. PCT/US2021/030952, 11 pages.

\* cited by examiner

SECURE ACCESS TO VEHICLE USING BIOMETRIC IDENTIFIER

TECHNICAL FIELD

The present disclosure generally relates to secure access to a vehicle, and more particularly relates to secure access to a vehicle using a biometric identifier.

BACKGROUND

Vehicles may be provided with security measures such as mechanical locks, remote access keys, numerical combination locks, among others. Such traditional security measures, however, may be vulnerable to unauthorized attempts to access and operate the vehicles, and in some cases, allow a third party to steal the vehicles. Stolen vehicles may be disassembled to individual parts to be sold separately. The traditional security measures, when breached, cause significant loss to the owners (e.g., thousands of dollars per a stolen vehicle), which amounts to a multi-billion dollars loss based on a statistical analysis. Improving security measures against auto theft, generally, may include strengthening protections against unauthorized access, making it more difficult to breach the protections to discourage nefarious attempts to access (or operate) vehicles, deterring sales of individual parts from stolen vehicles, among other measures.

DETAILED DESCRIPTION

Figure 1:
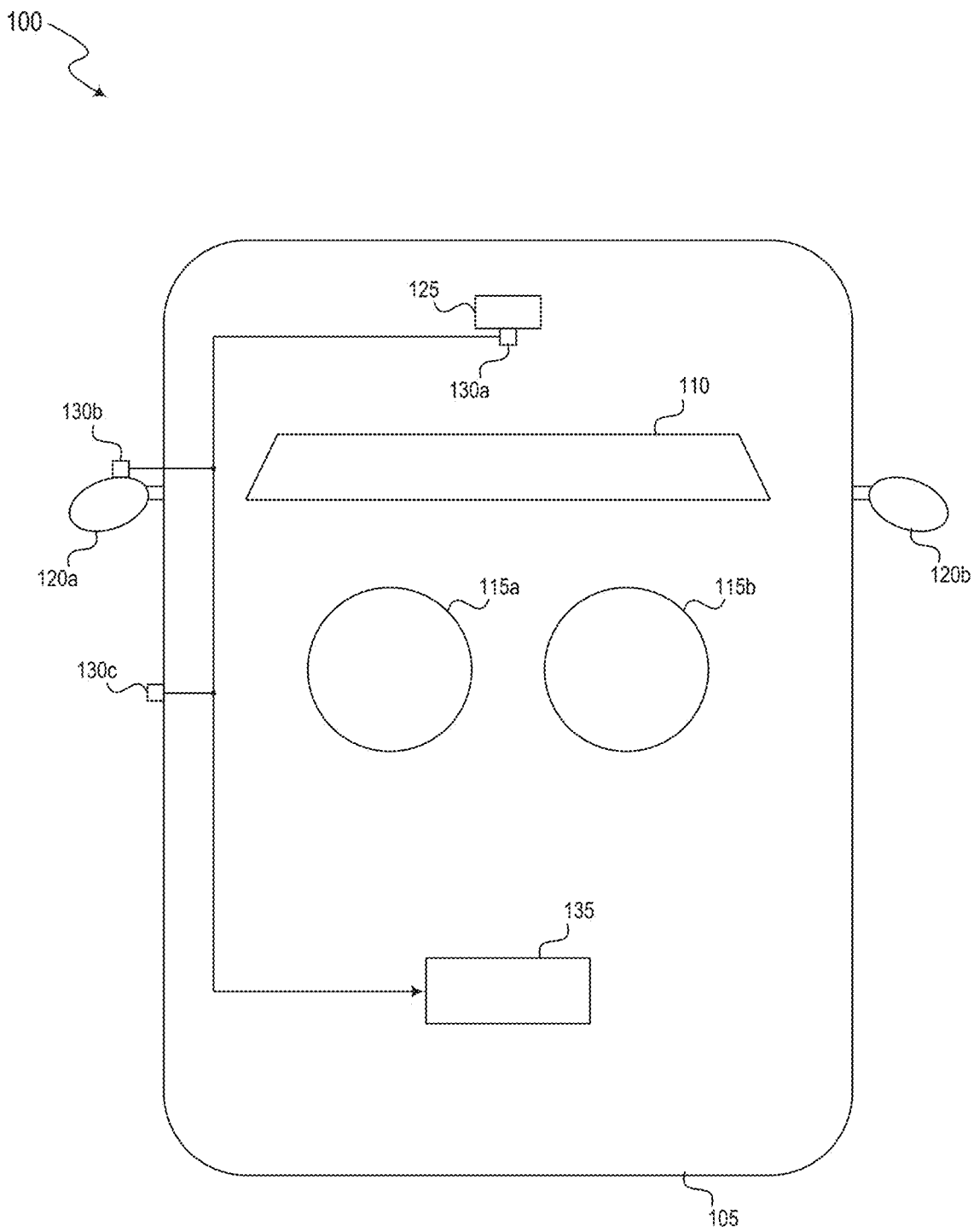
FIG. 1 is a block diagram illustrating a scheme of providing secure access to a vehicle using a biometric identifier in accordance with an embodiment of the present technology.

A vehicle may be equipped with security measures to prevent or discourage unauthorized access to the vehicle. Several embodiments of the present technology provide robust security measures, for example, by utilizing one or more biometric identifiers to enable a vehicle. In some embodiments, a user of the vehicle may not operate the vehicle (e.g., start the engine) without satisfying the security measures based on the biometric identifiers. An artificial intelligence engine or algorithm may be combined with (or otherwise utilized in conjunction with) the biometric identifiers to assist the security measures—e.g., perceiving various biological traits of users of the vehicle to recognize authorized users, distinguishing patterns between authenticated access and unauthenticated access, detecting anomalies in attempts to access the vehicle. In some embodiments, the security measures can manage various situations, such as updating a list of authorized users, temporarily disabling the secure access procedures, or the like. Also, the security measures may immobilize or disable a vehicle (e.g., electronically and/or mechanically shutting down the vehicle) when unauthorized access attempts exceed a predetermined threshold such that loss to the vehicle may be minimized.

Further, individual parts of the vehicle may be associated with a unique identifier of the vehicle (i.e., an identifier unique to the vehicle), for example to facilitate tracking the individual parts in case of illegal usage or sales. In some cases, the individual parts may be configured to transmit their geological locations. Additionally or alternatively, the individual parts (e.g., the engine) of the vehicle may be configured to operate only when they are coupled with other parts (e.g., the drivetrain) of the same vehicle—e.g., to deter illegal sales of the individual parts. For example, an engine associated with a unique identifier of a vehicle may operate only when it is coupled with a drivetrain associated with the same unique identifier of the vehicle.

In some embodiments, a secure access control unit of a vehicle may collect a biological trait of a user of a vehicle to determine whether to permit the user to operate the vehicle. The secure access control unit may utilize a sensing component, which may be integrated as part of the vehicle or appurtenant to the vehicle (e.g., auxiliary or peripheral to the vehicle). Such a sensing component may include a camera, a microphone, and/or a fingerprinting unit to collect various biological traits of the user, such as a facial feature, a voice print, a fingerprint, or a combination thereof. The secure access control unit may generate an identification of the user based on the biological trait of the user, which may also be referred to as a biometric identifier. Subsequently, the secure access control unit may compare the biometric identifier of the user with one or more biometric identifiers of the authorized users. In some cases, an artificial intelligence or algorithm may be utilized to generate the biometric identifier and/or to approve the user's access to the vehicle based on the biometric identifier or the biological traits—e.g., facial recognition, voice recognition, fingerprint recognition. When the secure access control unit determines that the biometric identifier of the user does not match with any biometric identifiers of the authorized users, the secure access control unit may prohibit the user from operating the vehicle (e.g., starting the engine).

In some embodiments, the secure access control unit may collect the biological trait of the user to facilitate managing various situations associated with the vehicle, such as updating the list of authorized users (e.g., adding a new user, deleting an existing user), selling/purchasing the vehicle (e.g., resetting the list of authorized users, compiling a new list of authorized users), temporarily disabling the secure access features for a time (e.g., leaving the vehicle to a mechanic for repairs and/or to a dealership for maintenance), etc. The secure access control unit, after collecting the biological trait of the user, may authenticate the user based on comparing the biological trait with a set of biological traits of authorized users of the vehicle, which may be stored in a memory. Further, the secure access control unit, based on authenticating the user as one of the authorized users, may prompt the user to determine whether to update the set of biological traits of the authorized users or to disable subsequent authentications.

A scheme of securing access to a vehicle based on biometric identifiers that supports an embodiment of the present technology is described with reference to FIG. 1. More detailed descriptions of a secure access control unit using biometric identifiers in accordance with various aspects of the present technology are provided with reference to FIG. 2. Further, FIG. 3 illustrates various parts of the vehicle, integrated with a secure access control unit using a biometric identifier in accordance with an embodiment of the present technology. A flowchart illustrating a method of providing secure access to a vehicle based on a biometric identifier is described with reference to FIG. 4. A flowchart illustrating a method of managing secure access to a vehicle based on a biometric identifier is described with reference to FIG. 5.

FIG. 1 is a block diagram 100 illustrating a scheme of providing secure access to a vehicle using a biometric identifier in accordance with an embodiment of the present technology. The diagram 100 includes a vehicle 105 that includes a dashboard 110, passenger seats 115a and 115b (collectively, "passenger seats 115"), side mirrors 120a and 120b (collectively, "side mirrors 120"), a back mirror 125, and sensing components 130a through 130c (collectively, "sensing components 130"). The sensing components 130 may be configured to collect various biological traits of a user of the vehicle 105 and may be referred to as biological sensing components. The biological traits may include a fingerprint, a facial feature, a voice print, or a combination thereof.

In some embodiments, the sensing components 130 may be internal to the vehicle 105 (e.g., in a passenger compartment of the vehicle 105). The diagram 100 depicts a sensing component 130a attached to the back mirror 125 (or integrated as a portion of the back mirror 125). In some cases, a sensing component 130a includes a camera positioned to take a picture of a user (e.g., a driver in the passenger seat 115a) or otherwise capture a facial feature of the user. Additionally or alternatively, the sensing component 130a may include a microphone that collects a voice print of the user. Further, the sensing component 130a may include a fingerprinting unit that takes a fingerprint of the user. The sensing component 130a may be located in other places within the passenger compartment, suitable for collecting such biological traits—e.g., over the dashboard 110 (or integrated as part of dashboard 110), on a steering wheel, attached to a ceiling of the passenger compartment, etc.

In some embodiments, the sensing components 130 may be external to the vehicle 105 (e.g., outside of the passenger compartment). The diagram 100 depicts a sensing component 130b attached to the side mirror 120a (or integrated as a portion of the side mirror 120a). As described above, the sensing component 130b may be configured to collect various biological traits of a user of the vehicle 105—e.g., including a camera, a microphone, a fingerprinting unit, or the like. The diagram 100 also depicts a sensing component 130c attached to a sidewall of the vehicle 105 (or located integral or proximate to a door handle of the vehicle 105). The sensing component 130c may also include a camera, a microphone, and/or a fingerprinting unit, to collect various biological traits of a user of the vehicle 105. In some cases, the sensing components external to the vehicle (e.g., the sensing component 130b, the sensing component 130c) may be utilized to permit (or prohibit) the user to enter the passenger compartment of the vehicle 105.

The diagram 100 includes a secure access control unit 135 coupled with the sensing components 130. In some cases, the secure access control unit 135 may be configured to generate an identification of the user based on the biological traits of the user collected using the sensing components 130. Such identification (which may also be referred to as biometric identifiers) may be a set of digitized information (e.g., processed by analog-to-digital converters, pattern-recognition devices and/or algorithms, other hardware and/ or software known to one skilled in the relevant art) converted from the biological traits collected using the sensing components 130. In some cases, the secure access control unit 135 may include an encoding component coupled with the sensing components 130, where the encoding component is configured to generate the set of digitized information. In some cases, the sensing components 130 may be configured to generate the identification of the user based on the biological trait of the user. In such cases, the sensing components 130 may provide the identification (the biometric identifier) of the user to the secure access control unit 135.

In some cases, additional biological traits of the user may be collected—e.g., to increase reliability of the secure access to the vehicle 105. For example, the sensing component 130a may collect a facial feature (e.g., a first biological trait) and a voice print (e.g., a second biological trait) such that the identification of the user may be generated based on both the facial feature and the voice print. In another example, the sensing component 130a may collect a facial feature (e.g., a first biological trait), and the sensing component 130c may collect a fingerprint (e.g., a second biological trait) such that the identification of the user may be generated based on both the facial feature and the fingerprint. In some cases, one or more biological traits of the user may be combined with a unique identifier of the vehicle (i.e., an identifier unique to the vehicle) to generate the identification of the user. In some embodiments, the unique identifier of the vehicle includes an official vehicle identification number (VIN) assigned to the vehicle. In some cases, the manufacturer of the vehicle may determine the unique identifier of the vehicle, and may hide from a third party.

In some cases, one or more biological traits of the user may be collected using a sensing component separate from the vehicle 105—e.g., a mobile phone. Such sensing component may also include a camera, a microphone, and/or a fingerprinting unit, which are configured to collect various biological traits of a user of the vehicle 105. In some embodiments, the secure access control unit 135 includes an adapting component that is configured to enable the sensing component (e.g., a mobile phone of the user) separate from the vehicle 105 such that the sensing component can communicate with the vehicle 105.

The secure access control unit 135 may determine whether a set of identifications of authorized users of the vehicle 105 includes the identification of the user. The set of identifications of the authorized users may be stored in a memory of the secure access control unit 135. The secure access control unit 135 may compare the identification of the user attempting to access the vehicle 105 with the identifications of authorized users. The secure access control unit 135, when the set of identifications of authorized users does not include the identification of the user (i.e., the identification of the user does not correspond to or match with any of the identifications of authorized users), may prohibit the user from operating the vehicle 105—e.g., starting the engine.

In some cases, the user may continue to attempt to access the vehicle 105 despite the secure access control unit 135 denying the user's access. In such cases, the secure access control unit 135 may electronically and/or mechanically shut down the vehicle so as to prohibit the user from operating the vehicle 105 in any event—e.g., breaking into the passenger compartment. For example, the secure access control unit 135 may disable an electronic component coupled with an engine of the vehicle 105, where the electronic component is configured to activate the engine. Additionally or alternatively, the secure access control unit 135 may lock one or more wheels of the vehicle 105 (e.g., mechanically prohibiting or hindering the wheels from rolling or otherwise immobilizing). In some cases, upon determining that a predetermined quantity of unsuccessful attempts (e.g., a predetermined threshold configured to trigger shutting down the vehicle 105) has been tried by the user (e.g., the user's third attempts to access the vehicle 105 is unsuccessful when the predetermined quantity corresponds to three (3)), the secure access control unit 135 may disable the electronic component and/or lock the one or more wheels of the vehicle 105 (or other parts associated with operating the vehicle 105, such as a powertrain of the vehicle 105). Further, the secure access control unit 135 may disable the sensing components 130 such that additional attempts (e.g., fourth or fifth attempts) may be blocked. In some cases, based on such determination, the secure access control unit 135 may inform the owner of the vehicle of such unsuccessful attempts that led to shutting down the vehicle 105—e.g., sending a text message to the owner's mobile phone, sending an email to the owner's email account, etc.

In some embodiments, the secure access control unit 135 may be configured to manage various situations associated with controlling secure access to the vehicle 105. For example, a legitimate owner of the vehicle 105 may want to update the set of identifications of authorized users of the vehicle 105—e.g., adding (or deleting) a person to (or from) the authorized users of the vehicle. Also, the owner of the vehicle 105 may want to temporarily disable the features of secure access to allow certain access to the vehicle 105 without an authentication—e.g., when the vehicle 105 is in a repair shop or requires maintenance by a mechanic. Further, when the vehicle is sold to another legitimate owner, the new owner may remove the previous owner from the set of identifications of authorized users (or the previous owner may want to delete his/her biometric identifier from the set). In some cases, a new owner of the vehicle 105 may want to delete all identifications of the authorized users established by a previous owner to compile a new list of authorized users.

In such cases, the secure access control unit 135 may collect a first biological trait of a first user of the vehicle 105 (e.g., a first legitimate owner) using a sensing component (e.g., the sensing components 130, the sensing component separate from the vehicle 105). The secure access control unit 135 may authenticate the first user based on comparing the first biological trait with a set of biological traits of authorized users of the vehicle stored in a memory. As described above, the biological traits may be converted to the identifications (e.g., biometric identifiers) to facilitate the comparison. Thereafter, the secure access control unit 135 may, based on successfully authenticating the first user as one of the authorized users, prompt the first user to determine whether to update the set of biological traits of the authorized users or to disable subsequent authentications.

When the first user determines to update the set of biological traits in response to the prompt, the secure access control unit 135 may collect a second biological trait of a second user of the vehicle 105 to add the second biological trait to the set of biological traits. Similarly, when the first user determines to update the set of biological traits, the secure access control unit 135 may select one or more biological traits from the set of biological traits (e.g., based on the first user's identifying the one or more biological traits) to remove the one or more biological traits from the set of biological traits. In some cases, the secure access control unit 135 may prompt the first user to confirm his/her decision to remove the one or more biological traits from the set of biological traits. Further, the secure access control unit 135 may remove the first biological trait from the set of biological traits—e.g., when the first user sells the vehicle and wants to remove his/her biometric identifiers from the vehicle 105.

In some cases, the first user may determine to disable the subsequent authentications—e.g., when the first user brings the vehicle 105 to a repair shop—in response to the prompt. Subsequently, the secure access control unit 135 may determine that a second user of the vehicle 105 (e.g., a mechanic at the repair shop) is one of the authorized users without collecting a second biological trait of the second user. Additionally or alternatively, the secure access control unit 135 may bypass authentication steps for the second user—e.g., skip collecting a biological trait of the second user to authenticate the second user. Further, the secure access control unit 135 may prompt the first user to determine a duration for disabling the subsequent authentications—e.g., a duration for the vehicle 105 expected to be in the repair shop. The secure access control unit 135 may monitor time passed since the duration is set, to determine whether the duration has lapsed. Once the secure access control unit 135 determines that the duration has lapsed, the secure access control unit 135 may restart the authentication process—e.g., collecting a second biological trait of a second user of the vehicle 105 using the sensing components 130 to authenticate the second user based on comparing the second biological trait (e.g., the biometric identifier of the second user) with the set of biological traits of the authorized users (e.g., the biometric identifiers of the authorized users).

In some embodiments, the security measure may be coupled with other information such as a geographical location of the vehicle—e.g., a location determined based on a global positioning system (GPS). For example, when the secure access control unit determines that the vehicle is in a usual place for the user (e.g., the user's work or home), the secure access control unit may collect one biological trait from the user (e.g., a facial feature). On the contrary, when the secure access control unit determines that the vehicle is in an unusual place for the user (e.g., a place where the user seldomly visits), the secure access control unit may collect additional biological traits (e.g., a fingerprint, a voice print) in addition to the one biological trait typically collected from the user (e.g., a facial feature).

Figure 2:
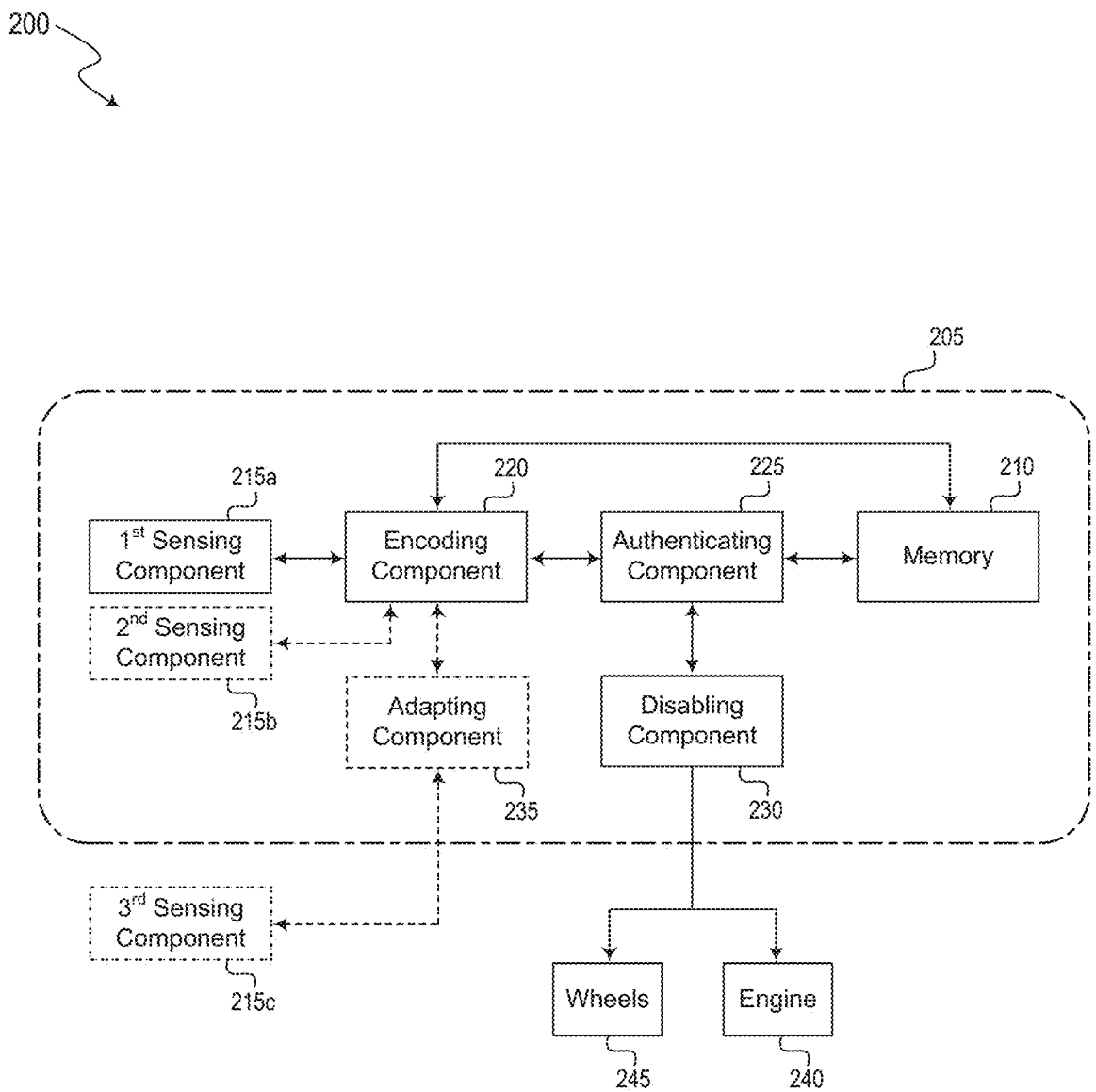
FIG. 2 is a block diagram schematically illustrating a secure access control unit utilizing a biometric identifier in accordance with an embodiment of the present technology.
Figure 3:
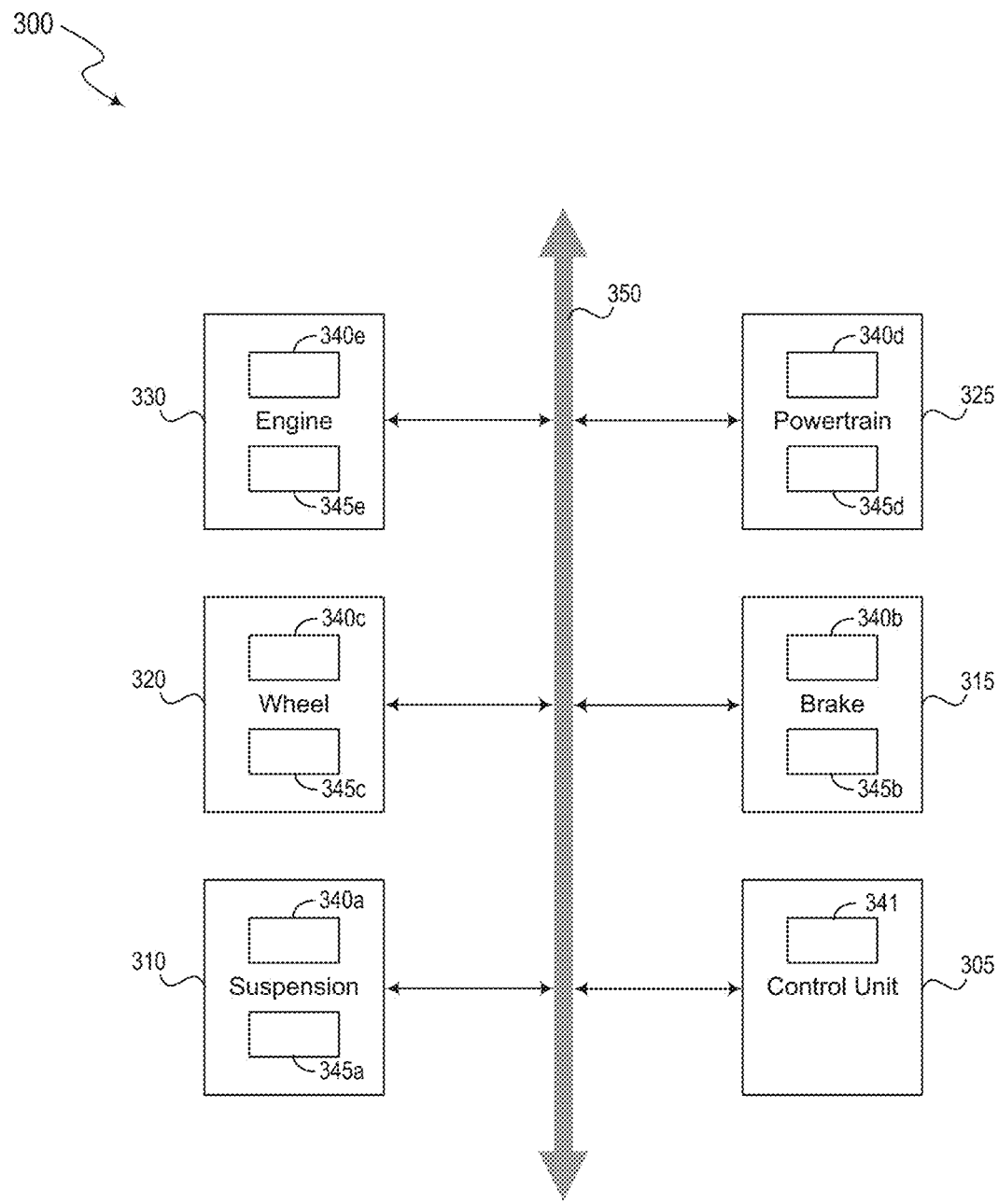
FIG. 3 is a block diagram schematically illustrating various parts of a vehicle, integrated with a secure access control unit of a vehicle in accordance with an embodiment of the present technology.

FIG. 2 is a block diagram 200 schematically illustrating a secure access control unit utilizing a biometric identifier in accordance with an embodiment of the present technology. The diagram 200 includes a secure access control unit 205, which may be an example of or include an aspect of the secure access control unit 135 described with reference to FIG. 1. The secure access control unit 205 of the diagram 200 includes a memory component 210, a first biological sensing component 215*a* (which may be an example of or include aspects of the sensing components 130), an encoding component 220, an authenticating component 225, and a disabling component 230, which may be further coupled with an engine 240 and/or one or more wheels of a vehicle (e.g., the vehicle 105).

The memory component 210 may be configured to store one or more identifications of authorized users of the vehicle, where the one or more identifications are generated based on biological traits of the authorized users. As such, the identifications may be referred to as biometric identifiers, where the biological traits comprise a fingerprint, a facial feature, a voice print, or a combination thereof.

The first biological sensing component 215a may collect a first biological trait of a user of the vehicle as described with reference to FIG. 1. The encoding component 220 is coupled with the first biological sensing component 215a, and may be configured to generate a first identification of the user based on the first biological trait. The encoding component 220 may include analog-to-digital converters, pattern-recognition devices and/or algorithms, or other hardware and/or software known to one skilled in the relevant art to convert the biological traits to a set of digitized information, in some cases. Additionally or alternatively, the encoding component 220 may include (or collaborate with) an artificial intelligence engine and/or algorithm to facilitate generating the first identification—e.g., perceiving distinctive features or patterns from the biological traits to include in the identification.

The authenticating component 225 is coupled with the encoding component 220 and the memory component 210, and may be configured to determine whether the one or more identifications stored in the memory component 210 include the first identification of the user. When the authenticating component 225 determines that the one or more identifications do not include the first identification of the user, the authenticating component 225 may, in conjunction with the disabling component 230 in some cases, prohibit the user from operating the vehicle. In some cases, the authenticating component 225 may include (or collaborate with) an artificial intelligence engine and/or algorithm to facilitate determining whether the first identification of the user matches with any one of identifications of the authorized users—e.g., recognizing an anomaly in the first identification for a swift determination to deny access to the vehicle.

The disabling component 230 coupled with the authenticating component 225 may, in conjunction with the authenticating component 225 in some cases, prohibit the user from operating the vehicle, when the authenticating component 225 determines that the one or more identifications do not comprise the first identification of the user. In some embodiments, the disabling component 230 may include (or coupled with) an electronic component that is coupled with the engine 240 of the vehicle. The electronic component may be configured to activate the engine only when the authenticating component 225 determines that one of the identifications of the authorized users matches with the first identification of the user. Additionally or alternatively, the disabling component 230 may include (or coupled with) a locking component coupled with one or more wheels 245 of the vehicle. The locking component may be configured to lock the one of more wheels of the vehicle when the authenticating component 225 determines that none of the identifications of the authorized users match with the first identification of the user. In this manner, the disabling component 230 may shut down (e.g., disabling the electronic component, activating the locking component) the vehicle, for example when the user repeatedly attempts to access the vehicle beyond a predetermined threshold—e.g., three (3) unsuccessful attempts to access the vehicle that trigger the vehicle shutdown.

In some embodiments, the secure access control unit 205 may include a second biological sensing component 215b coupled with the encoding component 220. The second biological sensing component 215b may be configured to collect a second biological trait of the user of the vehicle. Additionally, the encoding component 220 may be configured to generate the first identification of the user based on both the first biological trait and the second biological trait.

In some embodiments, the secure access control unit 205 may include an adapting component 235 coupled with the encoding component 220. The adapting component 235 may be configured to enable a third biological sensing component 215c (e.g., a mobile phone) to communicate with the vehicle, where the third component is separate from the vehicle and configured to collect one or more biological traits of the user.

FIG. 3 is a block diagram 300 schematically illustrating various parts of a vehicle (e.g., the vehicle 105), integrated (e.g., linked) with a secure access control unit of a vehicle in accordance with an embodiment of the present technology. The diagram 300 includes a secure access control unit 305, which may be an example of or include aspects of the secure access control units 135 and 205. The diagram 300 depicts several parts of the vehicle, such as one or more suspensions 310, one or more brakes 315, one or more wheels 320 (which may be examples of the wheels 245), a powertrain 325, and an engine 330 (which may be an example of the engine 240), among others. Individual parts of the vehicle may be coupled with the secure access control unit 305 via a bus 350 configured to exchange signals and/or information therethrough. In some embodiments, the bus 350 may include a wireless bus.

The secure access control unit 305, as described herein, may activate a locking component to lock the wheels 320 via the bus 350, or disable an electronic component configured to start the engine 330 via the bus 350. The secure access control unit 305 of the diagram 300 includes a memory 341, which may be an example of or include aspects of the memory component 210. In some embodiments, the memory 341 may store a unique identifier (e.g., a series of numbers) of the vehicle. In some cases, such identifier of the vehicle may be determined by the manufacturer of the vehicle, and may be hidden from a third party in some examples. In some cases, the unique identifier may include an official vehicle identification number (VIN). In some embodiments, the memory 341 includes nonvolatile memory cells such that the memory 314 may retain the unique identifier of the vehicle without power.

In some embodiments, individual parts of the vehicle may be associated with the unique identifier of the vehicle. The individual parts may store the unique identifier in corresponding memory cells 340 (e.g., memory cells 340a through 340e), which may include nonvolatile memory cells. Further, the individual parts of the vehicle may include corresponding locating components 345 (e.g., locating components 345a through 345e). Each locating component 345 (e.g., the locating component 345e) may be configured to transmit a location of a part (e.g., the engine 330) determined by a global positioning system (GPS).

The unique identifier of the vehicle that has been associated with the individual parts may facilitate tracking the individual parts in cases of a theft of the vehicle and subsequent illegal usage or sales of the individual parts of the stolen vehicle. Further, the locating components 345 can report its geological location independent of whereabouts of the stolen vehicle. Such tracking and reporting may deter nefarious attempts to steal a vehicle intending to disassemble the vehicle to sell individual parts.

Further, the individual parts may be configured to operate only when they are coupled with other legitimate parts via the bus 350 (e.g., each individual part linked to the bus 350 is associated with a same identifier of a vehicle). For example, if any of the parts (e.g., the brakes 315 with a first identifier of a first vehicle) is not present (e.g., coupled with, linked with) on the bus 350, one or more other parts (e.g., the engine 330, the powertrain 325, the wheels 320, the suspensions 310, each with the first identifier of the first vehicle) may not operate properly—e.g., even if they are mechanically assembled to operate with other parts (e.g., a brake having a second identifier of a second vehicle). In some cases, the secure access control unit 305 may confirm that each individual part on the bus 350 is associated with the expected (same) unique identifier of the vehicle. Further, the secure access control unit 305 may confirm none of the individual parts of the vehicle is absent on the bus 350.

Figure 4:
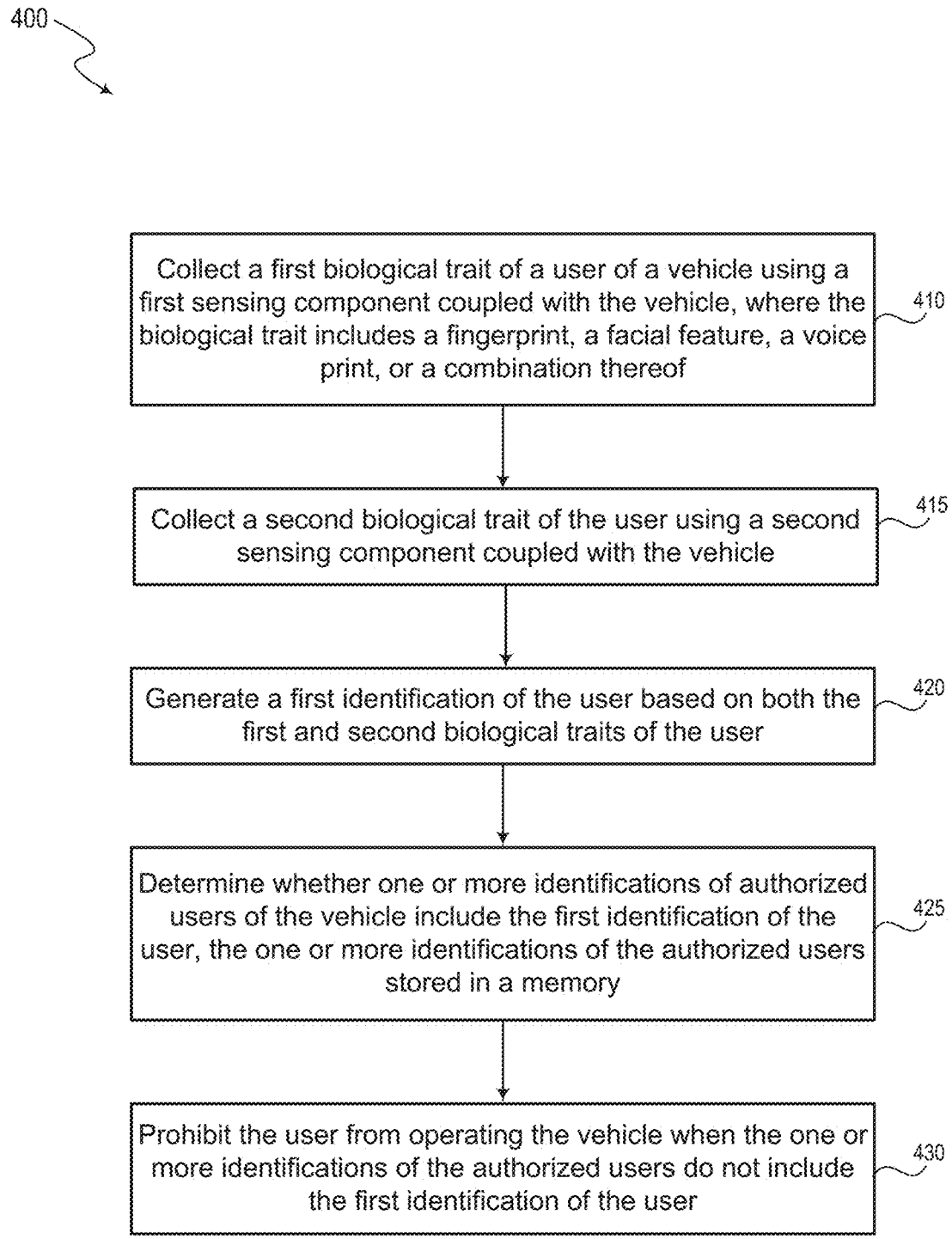
FIG. 4 is a flowchart illustrating a method of providing secure access to a vehicle based on a biometric identifier in accordance with an embodiment of the present technology.

FIG. 4 is a flowchart 400 illustrating a method of providing secure access to a vehicle based on a biometric identifier in accordance with an embodiment of the present technology. The flowchart 400 may be an example of or include aspects of a method that a secure access control unit (e.g., the secure access control unit 135, the secure access control unit 205, the secure access control unit 305) may perform as described with reference to FIGS. 1 through 3.

The method includes collecting a first biological trait of a user of a vehicle using a first sensing component coupled with the vehicle, where the biological trait includes a fingerprint, a facial feature, a voice print, or a combination thereof (box 410). In accordance with one aspect of the present technology, the collecting feature of box 410 can be performed by a secure access control unit (e.g., the secure access control unit 135 or the secure access control unit 205), in conjunction with a sensing component 130 or a biological sensing component 215 as described with reference to FIGS. 1 and 2.

The method further includes collecting a second biological trait of the user using a second sensing component coupled with the vehicle (box 415). In accordance with one aspect of the present technology, the collecting feature of box 415 can be performed by a secure access control unit (e.g., the secure access control unit 135 or the secure access control unit 205), in conjunction with a sensing component 130 or a biological sensing component 215 as described with reference to FIGS. 1 and 2.

The method further includes generating a first identification of the user based on both the first and second biological traits of the user (box 420). In accordance with one aspect of the present technology, the generating feature of box 420 can be performed by a secure access control unit (e.g., the secure access control unit 135 or the secure access control unit 205), in conjunction with the encoding component 220 as described with reference to FIGS. 1 and 2.

The method further includes determining whether one or more identifications of authorized users of the vehicle include the first identification of the user, the one or more identifications of the authorized users stored in a memory (box 425). In accordance with one aspect of the present technology, the determining feature of box 425 can be performed by a secure access control unit (e.g., the secure access control unit 135 or the secure access control unit 205), in conjunction with the authenticating component 225 as described with reference to FIGS. 1 and 2.

The method further includes prohibiting the user from operating the vehicle when the one or more identifications of the authorized users do not include the first identification of the user (box 430). In accordance with one aspect of the present technology, the prohibiting feature of box 430 can be performed by a secure access control unit (e.g., the secure access control unit 135 or the secure access control unit 205), in conjunction with the disabling component 230 as described with reference to FIGS. 1 and 2.

In some embodiments, generating the first identification of the user is based on combining a unique identifier of the vehicle with the first biological trait or the second biological trait, or both. In some embodiments, at least one part of the vehicle is associated with a unique identifier of the vehicle, and configured to transmit a location of the part determined by a global positioning system (GPS). In some embodiments, the unique identifier of the vehicle includes an official vehicle identification number (VIN) assigned to the vehicle.

In some embodiments, the method further includes disabling an electronic component coupled with an engine of the vehicle, the electronic component configured to activate the engine, where prohibiting the user from operating the vehicle is based on disabling the electronic component. In some embodiments, the method further includes locking one or more wheels of the vehicle, where prohibiting the user from operating the vehicle is based on locking the one or more wheels. In some embodiments, the method further includes enabling a third sensing component separate from the vehicle to communicate with the vehicle, the third sensing component configured to collect one or more biological traits including the first biological trait, where collecting the first biological trait of the user is based on enabling the third sensing component.

Figure 5:
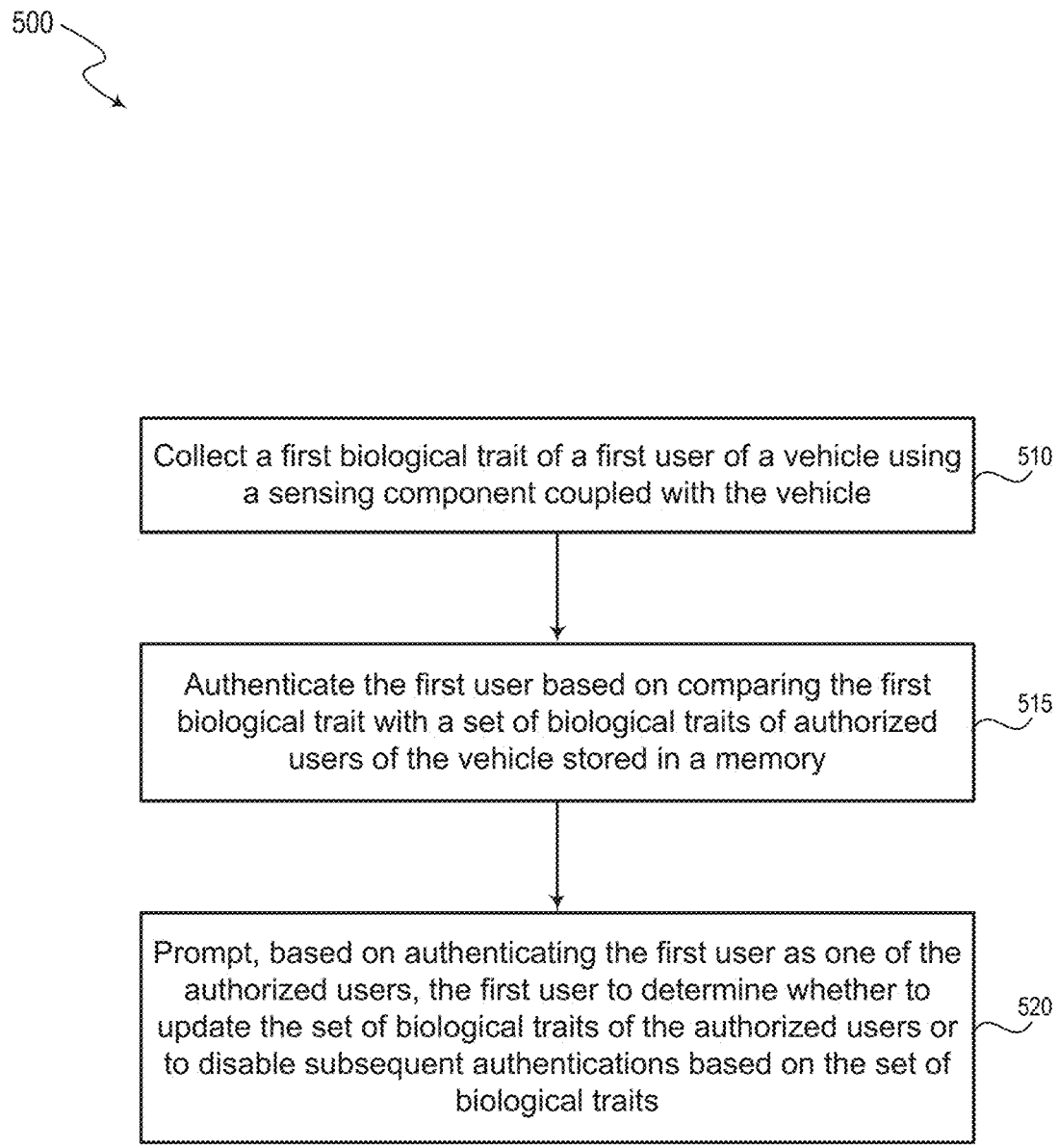
FIG. 5 is a flowchart illustrating a method of managing secure access to a vehicle based on a biometric identifier in accordance with an embodiment of the present technology.

FIG. 5 is a flowchart 500 illustrating a method of managing secure access to a vehicle based on a biometric identifier in accordance with an embodiment of the present technology. The flowchart 500 may be an example of or include aspects of a method that a secure access control unit (e.g., the secure access control unit 135, the secure access control unit 205, the secure access control unit 305) may perform as described with reference to FIGS. 1 through 3.

The method includes collecting a first biological trait of a first user of a vehicle using a sensing component coupled with the vehicle (box 510). In accordance with one aspect of the present technology, the collecting feature of box 510 can be performed by a secure access control unit (e.g., the secure access control unit 135 or the secure access control unit 205), in conjunction with a sensing component 130 or a biological sensing component 215 as described with reference to FIGS. 1 and 2.

The method includes authenticating the first user based on comparing the first biological trait with a set of biological traits of authorized users of the vehicle stored in a memory (box 515). In accordance with one aspect of the present technology, the authenticating feature of box 515 can be performed by a secure access control unit (e.g., the secure access control unit 135 or the secure access control unit 205), in conjunction with an authenticating component 225 as described with reference to FIGS. 1 and 2.

The method includes prompting, based on authenticating the first user as one of the authorized users, the first user to determine whether to update the set of biological traits of the authorized users or to disable subsequent authentications based on the set of biological traits (box 520). In accordance with one aspect of the present technology, the prompting feature of box 520 can be performed by a secure access control unit (e.g., the secure access control unit 135 or the secure access control unit 205) as described with reference to FIGS. 1 and 2.

In some embodiments, the method may further include collecting a second biological trait of a second user of the vehicle when the first user determines to update the set of biological traits, and adding the second biological trait to the set of biological traits. In some embodiments, the method may further include selecting one or more biological traits from the set of biological traits when the first user determines to update the set of biological traits, and removing the one or more biological traits from the set of biological traits.

In some embodiments, the method may further include removing the first biological trait from the set of biological traits when the first user determines to update the set of biological traits.

In some embodiments, the method may further include determining that a second user of the vehicle is one of the authorized users without collecting a second biological trait of the second user when the first user determines to disable the subsequent authentications based on the set of biological traits. In some embodiments, the method may further include prompting, when the first user determines to disable the subsequent authentications based on the set of biological traits, the first user to determine a duration for disabling the subsequent authentications. In some embodiments, the method may further include determining that the duration has lapsed, collecting a second biological trait of a second user of the vehicle using the sensing component, and authenticating the second user based on comparing the second biological trait with the set of biological traits of the authorized users.

Several embodiments of the present technology are directed to provide various levels of security against unauthorized access to a vehicle. Although the present technology is described with respect to providing security to access to a vehicle, the present technology is not limited thereto. For example, the security features using biometric identifiers may be implemented to provide security to other apparatuses, such as construction equipment, motor cycles, boats, planes, or the like. Further, although in the foregoing examples, sensing components have been described and illustrated as collecting facial features, voice prints, fingerprints, and/or combinations thereof, in other embodiments, additional and/or alternative biological traits could be collected. For example, three dimensional maps of portions of a user's body (e.g., face, head, etc.), palm prints, capillary structures (e.g., in a user's iris), etc. may also be collected and used as set forth above.

It should be noted that the methods described above describe possible implementations, and that the operations and the steps may be rearranged or otherwise modified and that other implementations are possible. Furthermore, embodiments from two or more of the methods may be combined.

The functions described herein may be implemented in hardware, software executed by a processor, firmware, or any combination thereof. Other examples and implementations are within the scope of the disclosure and appended claims. Features implementing functions may also be physically located at various positions, including being distributed such that portions of functions are implemented at different physical locations.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

From the foregoing, it will be appreciated that specific embodiments of the invention have been described herein for purposes of illustration, but that various modifications may be made without deviating from the scope of the invention. Rather, in the foregoing description, numerous specific details are discussed to provide a thorough and enabling description for embodiments of the present technology. One skilled in the relevant art, however, will recognize that the disclosure can be practiced without one or more of the specific details. In other instances, well-known structures or operations often associated with memory systems and devices are not shown, or are not described in detail, to avoid obscuring other aspects of the technology. In general, it should be understood that various other devices, systems, and methods in addition to those specific embodiments disclosed herein may be within the scope of the present technology.

What is claimed is:

1. A method, comprising:
collecting a first biological trait of a user of a vehicle using a first sensing component coupled with the vehicle, wherein the biological trait includes a fingerprint, a facial feature, a voice print, or a combination thereof;
determining a current location of the vehicle and a frequency of prior visits to the current location;
determining that the frequency of prior visits is below a threshold;
collecting a second biological trait of the user using a second sensing component coupled with the vehicle in response to determining that the frequency of prior visits is below the threshold;
generating a first identification of the user based on combining a unique identifier of the vehicle with both the first and second biological traits of the user, wherein the unique identifier is determined by a manufacturer of the vehicle, and is hidden from a third party;
determining whether one or more identifications of authorized users of the vehicle include the first identification of the user, the one or more identifications of the authorized users stored in a memory; and
prohibiting the user from operating the vehicle when the one or more identifications of the authorized users do not include the first identification of the user.

2. The method of claim 1, wherein at least one part of the vehicle is associated with the unique identifier of the vehicle, and configured to transmit a location of the part determined by a global positioning system (GPS).

3. The method of claim 1, further comprising:
disabling an electronic component coupled with an engine of the vehicle, the electronic component configured to activate the engine, wherein prohibiting the user from operating the vehicle is based at least in part on disabling the electronic component.

4. The method of claim 1, further comprising:
locking one or more wheels of the vehicle, wherein prohibiting the user from operating the vehicle is based at least in part on locking the one or more wheels.

5. The method of claim 1, further comprising:
enabling a third sensing component separate from the vehicle to communicate with the vehicle, the third sensing component configured to collect one or more biological traits including the first biological trait, wherein collecting the first biological trait of the user is based at least in part on enabling the third sensing component.

6. The method of claim 1, further comprising:
informing an owner of the vehicle of prohibiting the user from operating the vehicle by sending a text message to the owner's mobile phone, sending an email to the owner's email account, or both.

7. The method of claim 1, wherein the vehicle includes at least two mechanical parts for operating the vehicle, the at least two mechanical parts each configured to operate only when coupled to each other via a bus of the vehicle.

8. An apparatus, comprising:
a memory component configured to store one or more identifications of authorized users of a vehicle, the one or more identifications generated based on biological traits of the authorized users, wherein the biological traits include a fingerprint, a facial feature, a voice print, or a combination thereof, and wherein the memory component is configured to store the vehicle's locations over a fixed period of time;
a first biological sensing component configured to collect a first biological trait of a user of the vehicle;
a second biological sensing component configured to collect a second biological trait of the user;
an encoding component coupled with the first and second biometric sensing components, the encoding component configured to generate a first identification of the user based on combining a unique identifier of the vehicle with the first and second biological traits collected by the first and second biological sensing components, wherein the unique identifier is determined by a manufacturer of the vehicle, and is hidden from a third party, and wherein the second biological trait is collected in response to determining that a frequency of prior visits to a current location of the vehicle is below a threshold, the frequency of prior visits determined based on the vehicle's locations over the fixed period of time;
an authenticating component coupled with the encoding component and the memory component, the authenticating component configured to determine whether the one or more identifications include the first identification; and
a disabling component coupled with the vehicle, the disabling component configured to prohibit the user from operating the vehicle when the one or more identifications do not include the first identification.

9. The apparatus of claim 8, wherein at least one part of the vehicle is associated with the unique identifier of the vehicle, and configured to transmit a location of the part determined by a global positioning system (GPS).

10. The apparatus of claim 8, further comprising:
an adapting component coupled with the encoding component and configured to enable a third biological sensing component to communicate with the vehicle, the third component separate from the vehicle and configured to collect one or more biological traits of the user including the first biological trait.

11. The apparatus of claim 8, wherein the disabling component includes an electronic component coupled with an engine of the vehicle, the electronic component configured to activate the engine only when the authenticating component determines that the one or more identifications of the authorized users include the first identification of the user.

12. The apparatus of claim 8, wherein the disabling component includes a locking component coupled with one or more wheels of the vehicle, the locking component configured to lock the one of more wheels of the vehicle when the authenticating component determines that the one or more identifications of the authorized users do not include the first identification of the user.

13. The apparatus of claim 8, wherein the disabling component is further configured to inform an owner of the vehicle of prohibiting the user from operating the vehicle by sending a text message to the owner's mobile phone, sending an email to the owner's email account, or both.

14. The apparatus of claim 8, wherein the vehicle includes at least two mechanical parts for operating the vehicle, the at least two mechanical parts each configured to operate only when coupled to each other via a bus of the vehicle.

15. The apparatus of claim 14, wherein the bus includes a wireless bus.

16. The apparatus of claim 14, wherein the at least two mechanical parts each includes nonvolatile memory cells configured to store a unique identifier of the vehicle without electrical power, the unique identifier hidden from a third party and determined by a manufacturer of the vehicle.

17. The apparatus of claim 14, wherein the at least two mechanical parts each includes a locating component configured to transmit a location of the mechanical part determined by a global positioning system.

* * * * *